United States Patent
Willis

(10) Patent No.: US 6,781,737 B2
(45) Date of Patent: Aug. 24, 2004

(54) PULSE WIDTH MODULATED DISPLAY WITH HYBRID CODING

(75) Inventor: Donald Henry Willis, Indianapolis, IN (US)

(73) Assignee: Thomson Licensing S.A., Boulogne-Billancourt (FR)

(*) Notice: Subject to any disclaimer, the term of this patent is extended or adjusted under 35 U.S.C. 154(b) by 27 days.

(21) Appl. No.: 10/354,528

(22) Filed: Jan. 30, 2003

(65) Prior Publication Data

US 2004/0032636 A1 Feb. 19, 2004

Related U.S. Application Data

(60) Provisional application No. 60/403,190, filed on Aug. 13, 2002.

(51) Int. Cl.[7] .............................. G02F 1/03; G02F 1/07

(52) U.S. Cl. ........................ 359/264; 359/242; 359/238

(58) Field of Search .................................. 359/238, 242, 359/264; 345/691; 348/471; 398/189, 191; 332/106, 109, 111, 183; 363/26

(56) References Cited

U.S. PATENT DOCUMENTS

| | | | | |
|---|---|---|---|---|
| 5,293,159 A | * | 3/1994 | Bassetti et al. | 345/691 |
| 5,986,640 A | | 11/1999 | Baldwin et al. | 345/596 |
| 6,204,834 B1 | * | 3/2001 | Baker et al. | 345/75.2 |
| 6,388,678 B1 | * | 5/2002 | Kasahara et al. | 345/690 |
| 6,618,031 B1 | * | 9/2003 | Bohn et al. | 345/83 |

OTHER PUBLICATIONS

"Single Panel DLP™ Projection System Optics", Application Report DLPA Jun. 2, 2001, Texas Instruments.
"DLP™ Projection System Digital Iamge Artifacts" Application Report DLPA Mar. 3, 2001, Texas Instruments.
"High Definition Display System Based on Digital Micromirror Device", Robert J. Grove et al. *International Workshop on HDTV* (Oct. 1994).
"DMD Systems: The Impact of an All-Digital Display" Robert J. Grove. *Society for Information Display International Symposium*, (Jun., 1994).
"Digital Micromirror Display for Projection TV", Michael Mignardi, *Solid State Technology*, vol. 37, pp 63–66, (Jul. 1994).

* cited by examiner

*Primary Examiner*—Jordan M. Schwartz
*Assistant Examiner*—Jessica Stultz
(74) *Attorney, Agent, or Firm*—Joseph S. Tripoli; Harvey D. Fried; Robert B. Levy

(57) ABSTRACT

A display system (10) comprises a digital micromirror device (DMD) (24) controlled by a driver circuit (30) responsive to sequences of pulse width segments formed by a processor (31). The processor (31) increases the pixel brightness by actuating selected pulses such that within a first range of brightness levels between first and second pixel brightness boundaries, a first large-duration pulse element becomes actuated to reach the second pixel brightness boundary, and within a second range of pixel brightness levels between second and third pixel brightness boundaries, the first large duration pulse element remains actuated. Upon reaching the third pixel brightness boundary, a second large duration pulse element now becomes actuated with the first large duration pulse element remaining actuated. Forming the pulse width segments in this manner serves to reduce motion contouring.

14 Claims, 6 Drawing Sheets

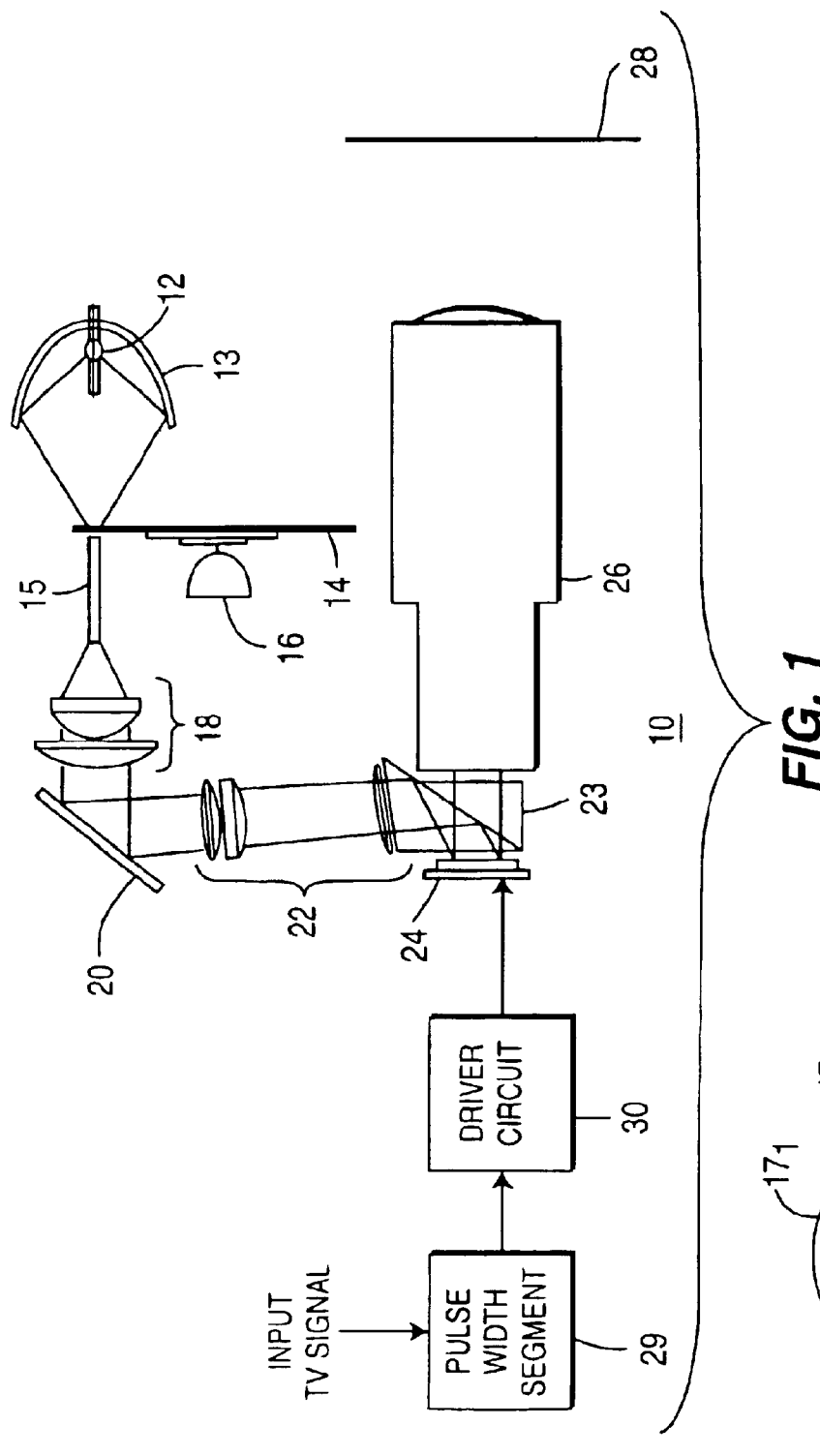
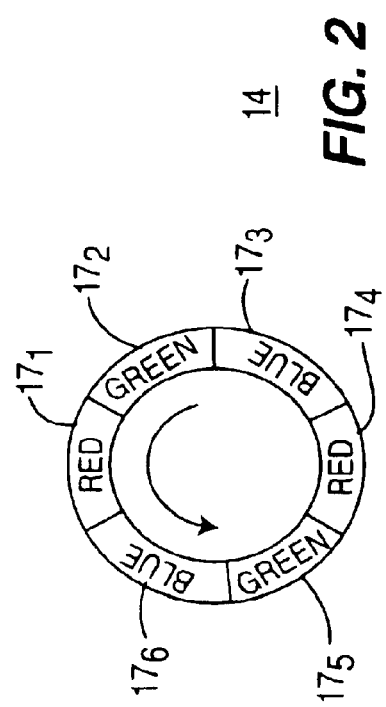

FIG. 3

| | SEGMENT 1 | SEGMENT 2 | SEGMENT 3 | SEGMENT 4 | SEGMENT 5 | |
|---|---|---|---|---|---|---|
| | ☐4 13 2 13 6☐ | 7 13 1 13 4☐ | 4 13 2 13 6☐ | 7 13 1 13 4☐ | 4 13 2 13 6☐ | |
| 0 | | | | | | 0 |
| 1 | | 1 | | | | 1 |
| 2 | | | 2 | | | 2 |
| 3 | | 1 | 2 | | | 3 |
| 4 | | | 4 | | | 4 |
| 5 | | 1 | 4 | | | 5 |
| 6 | | | 4 2 | | | 6 |
| 7 | | 1 | 4 2 | | | 7 |
| 8 | | | 2 6 | | | 8 |
| 9 | | 1 | 2 6 | | | 9 |
| 10 | | | 4 6 | | | 10 |
| 11 | | 1 | 4 6 | | | 11 |
| 12 | | | 4 2 6 | | | 12 |
| 13 | | | 13 | | | 13 |
| 14 | | 1 | 13 | | | 14 |
| 15 | | | 2 13 | | | 15 |
| 16 | | 1 | 2 13 | | | 16 |
| 17 | | | 4 13 | | | 17 |
| 18 | | 1 | 4 13 | | | 18 |
| 19 | | | 4 2 13 | | | 19 |
| 20 | | 1 | 4 2 13 | | | 20 |
| 21 | | | 2 13 6 | | | 21 |
| 22 | | 1 | 2 13 6 | | | 22 |
| 23 | | | 4 13 6 | | | 23 |
| 24 | | 1 | 4 13 6 | | | 24 |
| 25 | | | 4 2 13 6 | | | 25 |
| 26 | | | 13 13 | | | 26 |
| 27 | | 1 | 13 13 | | | 27 |
| 28 | | | 13 2 13 | | | 28 |
| 29 | | 1 | 13 2 13 | | | 29 |
| 30 | | | 4 13 13 | | | 30 |
| 31 | | 1 | 4 13 13 | | | 31 |
| 32 | | | 4 13 2 13 | | | 32 |
| 33 | | 1 | 4 13 2 13 | | | 33 |
| 34 | | | 13 2 13 6 | | | 34 |
| 35 | | 1 | 13 2 13 6 | | | 35 |
| 36 | | | 4 13 13 6 | | | 36 |
| 37 | | 1 | 4 13 13 6 | | | 37 |
| 38 | | | 4 13 2 13 6 | | | 38 |
| 39 | | | 7 13 13 6 | 6 | | 39 |
| 40 | | 1 | 7 13 13 6 | 6 | | 40 |
| 41 | | | 7 13 2 13 6 | 6 | | 41 |
| 42 | | 1 | 7 13 2 13 6 | 6 | | 42 |
| 43 | | | 7 4 13 13 6 | 6 | | 43 |
| 44 | | 1 | 7 4 13 13 6 | 6 | | 44 |
| 45 | | | 7 4 13 2 13 6 | 6 | | 45 |
| 46 | | 1 | 7 4 13 2 13 6 | 6 | | 46 |
| 47 | | | 7 13 2 13 6 6 | 6 | | 47 |
| 48 | | 1 | 7 13 2 13 6 6 | 6 | | 48 |
| 49 | | | 7 4 13 13 6 6 | 6 | | 49 |

FIG. 4

| SEGMENT 1 | SEGMENT 2 | SEGMENT 3 | SEGMENT 4 | SEGMENT 5 |
|---|---|---|---|---|
| 50 |  | 7 4 13    13 6 6 |  | 50 |
| 51 | 1 | 7 4 13 2 13 6 6 |  | 51 |
| 52 |  | 7 4 13 2 13 6 6 |  | 52 |
| 53 | 1 | 7 4 13    13 6 6 |  | 53 |
| 54 | 4 | 7 4 13    13 6 6 |  | 54 |
| 55 | 1   4 | 7 4 13 2 13 6 6 |  | 55 |
| 56 | 4 | 7 4 13    13 6 6 |  | 56 |
| 57 | 7 | 7 4 13    13 6 6 |  | 57 |
| 58 | 7 1 | 7 4 13 2 13 6 6 |  | 58 |
| 59 | 7 | 7 4 13 2 13 6 6 |  | 59 |
| 60 | 7 1 | 7 4 13    13 6 6 |  | 60 |
| 61 | 7      4 | 7 4 13    13 6 6 |  | 61 |
| 62 | 7 1    4 | 7 4 13    13 6 6 |  | 62 |
| 63 | 13 | 7 4 13    13 6 6 |  | 63 |
| 64 | 13 1 | 7 4 13 2 13 6 6 |  | 64 |
| 65 | 13 | 7 4 13 2 13 6 6 |  | 65 |
| 66 | 13 1 | 7 4 13    13 6 6 |  | 66 |
| 67 | 13      4 | 7 4 13    13 6 6 |  | 67 |
| 68 | 13 1    4 | 7 4 13 2 13 6 6 |  | 68 |
| 69 | 13      4 | 7 4 13    13 6 6 |  | 69 |
| 70 | 7 13 | 7 4 13    13 6 6 |  | 70 |
| 71 | 7 13 1 | 7 4 13    13 6 6 |  | 71 |
| 72 | 7 13 | 7 4 13    13 6 6 |  | 72 |
| 73 | 7 13 1 | 7 4 13    13 6 6 |  | 73 |
| 74 | 7 13      4 | 7 4 13 2 13 6 6 |  | 74 |
| 75 | 7 13 1    4 | 7 4 13 2 13 6 6 |  | 75 |
| 76 | 13   13 | 7 4 13    13 6 6 |  | 76 |
| 77 | 13 1 13 | 7 4 13    13 6 6 |  | 77 |
| 78 | 13   13 | 7 4 13 2 13 6 6 |  | 78 |
| 79 | 13 1 13 4 | 7 4 13    13 6 6 |  | 79 |
| 80 | 13   13 4 | 7 4 13    13 6 6 |  | 80 |
| 81 | 13 1 13 4 | 7 4 13 2 13 6 6 |  | 81 |
| 82 | 13   13 4 | 7 4 13 2 13 6 6 |  | 82 |
| 83 | 7 13   13 | 7 4 13    13 6 6 |  | 83 |
| 84 | 7 13 1 13 | 7 4 13    13 6 6 |  | 84 |
| 85 | 7 13   13 | 7 4 13    13 6 6 |  | 85 |
| 86 | 7 13 1 13 | 7 4 13    13 6 6 |  | 86 |
| 87 | 7 13   13 4 | 7 4 13 2 13 6 6 |  | 87 |
| 88 | 7 13 1 13 4 | 7 4 13 2 13 6 6 |  | 88 |
| 89 | 7   13   13   6 | 7 4 13    13 6 6 |  | 89 |
| 90 | 7   13 1 13   6 | 7 4 13    13 6 6 |  | 90 |
| 91 | 7   13   13   6 | 7 4 13 2 13 6 6 |  | 91 |
| 92 | 7   13 1 13   6 | 7 4 13 2 13 6 6 |  | 92 |
| 93 | 7   13   13 4 6 | 7 4 13    13 6 6 |  | 93 |
| 94 | 7   13 1 13 4 6 | 7 4 13    13 6 6 |  | 94 |
| 95 | 7   13   13 4 6 | 7 4 13 2 13 6 6 |  | 95 |
| 96 | 7 7 13   13   6 | 7 4 13    13 6 6 |  | 96 |
| 97 | 7 7 13 1 13   6 | 7 4 13    13 6 6 |  | 97 |
| 98 | 7 7 13   13   6 | 7 4 13 2 13 6 6 |  | 98 |
| 99 | 7 7 13 1 13   6 | 7 4 13 2 13 6 6 |  | 99 |
| 100 | 7 7 13   13 4 6 | 7 4 13    13 6 6 |  | 100 |
| 101 | 7 7 13 1 13 4 6 | 7 4 13    13 6 6 |  | 101 |
| 102 | 7 7 13 1 13 4 6 | 7 4 13 2 13 6 6 |  | 102 |

FIG. 5

| SEGMENT 1 | SEGMENT 2 | SEGMENT 3 | SEGMENT 4 | SEGMENT 5 |
|---|---|---|---|---|
| 103 | 7 7 13 1 13 4 6 | 7 4 13 2 13 6 6 | 1 | 103 |
| 104 | 7 7 13 1 13 4 6 | 7 4 13   13 6 6 |       4 | 104 |
| 105 | 7 7 13 1 13 4 6 | 7 4 13   13 6 6 | 1     4 | 105 |
| 106 | 7 7 13 1 13 4 6 | 7 4 13 2 13 6 6 |       4 | 106 |
| 107 | 7 7 13 1 13 4 6 | 7 4 13   13 6 6 | 7 | 107 |
| 108 | 7 7 13 1 13 4 6 | 7 4 13   13 6 6 | 7  1 | 108 |
| 109 | 7 7 13 1 13 4 6 | 7 4 13 2 13 6 6 | 7 | 109 |
| 110 | 7 7 13 1 13 4 6 | 7 4 13 2 13 6 6 | 7  1 | 110 |
| 111 | 7 7 13 1 13 4 6 | 7 4 13   13 6 6 | 7      4 | 111 |
| 112 | 7 7 13 1 13 4 6 | 7 4 13   13 6 6 | 7  1   4 | 112 |
| 113 | 7 7 13 1 13 4 6 | 7 4 13   13 6 6 |   13 | 113 |
| 114 | 7 7 13 1 13 4 6 | 7 4 13   13 6 6 |   13 1 | 114 |
| 115 | 7 7 13 1 13 4 6 | 7 4 13 2 13 6 6 |   13 | 115 |
| 116 | 7 7 13 1 13 4 6 | 7 4 13 2 13 6 6 |   13 1 | 116 |
| 117 | 7 7 13 1 13 4 6 | 7 4 13   13 6 6 |   13    4 | 117 |
| 118 | 7 7 13 1 13 4 6 | 7 4 13   13 6 6 |   13 1  4 | 118 |
| 119 | 7 7 13 1 13 4 6 | 7 4 13 2 13 6 6 |   13    4 | 119 |
| 120 | 7 7 13 1 13 4 6 | 7 4 13   13 6 6 | 7 13 | 120 |
| 121 | 7 7 13 1 13 4 6 | 7 4 13   13 6 6 | 7 13 1 | 121 |
| 122 | 7 7 13 1 13 4 6 | 7 4 13 2 13 6 6 | 7 13 | 122 |
| 123 | 7 7 13 1 13 4 6 | 7 4 13 2 13 6 6 | 7 13 1 | 123 |
| 124 | 7 7 13 1 13 4 6 | 7 4 13   13 6 6 | 7 13    4 | 124 |
| 125 | 7 7 13 1 13 4 6 | 7 4 13   13 6 6 | 7 13 1  4 | 125 |
| 126 | 7 7 13 1 13 4 6 | 7 4 13   13 6 6 |   13   13 | 126 |
| 127 | 7 7 13 1 13 4 6 | 7 4 13   13 6 6 |   13 1 13 | 127 |
| 128 | 7 7 13 1 13 4 6 | 7 4 13 2 13 6 6 |   13   13 | 128 |
| 129 | 7 7 13 1 13 4 6 | 7 4 13 2 13 6 6 |   13 1 13 | 129 |
| 130 | 7 7 13 1 13 4 6 | 7 4 13   13 6 6 |   13   13 4 | 130 |
| 131 | 7 7 13 1 13 4 6 | 7 4 13   13 6 6 |   13 1 13 4 | 131 |
| 132 | 7 7 13 1 13 4 6 | 7 4 13 2 13 6 6 |   13   13 4 | 132 |
| 133 | 7 7 13 1 13 4 6 | 7 4 13   13 6 6 | 7 13   13 | 133 |
| 134 | 7 7 13 1 13 4 6 | 7 4 13   13 6 6 | 7 13 1 13 | 134 |
| 135 | 7 7 13 1 13 4 6 | 7 4 13 2 13 6 6 | 7 13   13 | 135 |
| 136 | 7 7 13 1 13 4 6 | 7 4 13 2 13 6 6 | 7 13 1 13 | 136 |
| 137 | 7 7 13 1 13 4 6 | 7 4 13   13 6 6 | 7 13   13 4 | 137 |
| 138 | 7 7 13 1 13 4 6 | 7 4 13   13 6 6 | 7 13 1 13 4 | 138 |
| 139 | 7 7 13 1 13 4 6 | 7 4 13   13 6 6 | 7    13   13   6 | 139 |
| 140 | 7 7 13 1 13 4 6 | 7 4 13   13 6 6 | 7    13 1 13   6 | 140 |
| 141 | 7 7 13 1 13 4 6 | 7 4 13 2 13 6 6 | 7    13   13   6 | 141 |
| 142 | 7 7 13 1 13 4 6 | 7 4 13 2 13 6 6 | 7    13 1 13   6 | 142 |
| 143 | 7 7 13 1 13 4 6 | 7 4 13   13 6 6 | 7    13   13 4 6 | 143 |
| 144 | 7 7 13 1 13 4 6 | 7 4 13   13 6 6 | 7    13 1 13 4 6 | 144 |
| 145 | 7 7 13 1 13 4 6 | 7 4 13 2 13 6 6 | 7    13   13 4 6 | 145 |
| 146 | 7 7 13 1 13 4 6 | 7 4 13   13 6 6 | 7 7 13   13   6 | 146 |
| 147 | 7 7 13 1 13 4 6 | 7 4 13   13 6 6 | 7 7 13 1 13   6 | 147 |
| 148 | 7 7 13 1 13 4 6 | 7 4 13 2 13 6 6 | 7 7 13   13   6 | 148 |
| 149 | 7 7 13 1 13 4 6 | 7 4 13 2 13 6 6 | 7 7 13 1 13   6 | 149 |
| 150 | 7 7 13 1 13 4 6 | 7 4 13   13 6 6 | 7 7 13   13 4 6 | 150 |
| 151 | 7 7 13 1 13 4 6 | 7 4 13   13 6 6 | 7 7 13 1 13 4 6 | 151 |
| 152 | 7 7 13 1 13 4 6 | 7 4 13   13 6 6 | 7 7 13 1 13 4 6 | 152 |
| 153 | 7 7 13 1 13 4 6 | 7 4 13   13 6 6 | 7 7 13 1 13 4 6 | 153 |
| 154 | 7 7 13 1 13 4 6 | 7 4 13   13 6 6 | 7 7 13 1 13 4 6 | 154 |
| 155 | 7 7 13 1 13 4 6 | 7 4 13   13 6 6 | 7 7 13 1 13 4 6 | 155 |

FIG. 6

| | SEGMENT 1 | SEGMENT 2 | SEGMENT 3 | SEGMENT 4 | SEGMENT 5 | |
|---|---|---|---|---|---|---|
| 156 | 4   2       | 7 7 13   13 4 6 | 7 4 13   13 6 6 | 7 7 13 1 13 4 6 |     | 156 |
| 157 | 4   2       | 7 7 13 1 13 4 6 | 7 4 13   13 6 6 | 7 7 13 1 13 4 6 |     | 157 |
| 158 |     2     6 | 7 7 13   13 4 6 | 7 4 13   13 6 6 | 7 7 13 1 13 4 6 |     | 158 |
| 159 |     2     6 | 7 7 13 1 13 4 6 | 7 4 13   13 6 6 | 7 7 13 1 13 4 6 |     | 159 |
| 160 | 4         6 | 7 7 13   13 4 6 | 7 4 13   13 6 6 | 7 7 13 1 13 4 6 |     | 160 |
| 161 | 4         6 | 7 7 13 1 13 4 6 | 7 4 13   13 6 6 | 7 7 13 1 13 4 6 |     | 161 |
| 162 | 4   2     6 | 7 7 13   13 4 6 | 7 4 13   13 6 6 | 7 7 13 1 13 4 6 |     | 162 |
| 163 |       13    | 7 7 13   13 4 6 | 7 4 13   13 6 6 | 7 7 13 1 13 4 6 |     | 163 |
| 164 |       13    | 7 7 13 1 13 4 6 | 7 4 13   13 6 6 | 7 7 13 1 13 4 6 |     | 164 |
| 165 |     2 13    | 7 7 13   13 4 6 | 7 4 13   13 6 6 | 7 7 13 1 13 4 6 |     | 165 |
| 166 |     2 13    | 7 7 13 1 13 4 6 | 7 4 13   13 6 6 | 7 7 13 1 13 4 6 |     | 166 |
| 167 | 4     13    | 7 7 13   13 4 6 | 7 4 13   13 6 6 | 7 7 13 1 13 4 6 |     | 167 |
| 168 | 4     13    | 7 7 13 1 13 4 6 | 7 4 13   13 6 6 | 7 7 13 1 13 4 6 |     | 168 |
| 169 | 4   2 13    | 7 7 13   13 4 6 | 7 4 13   13 6 6 | 7 7 13 1 13 4 6 |     | 169 |
| 170 | 4   2 13    | 7 7 13 1 13 4 6 | 7 4 13   13 6 6 | 7 7 13 1 13 4 6 |     | 170 |
| 171 |     2 13  6 | 7 7 13   13 4 6 | 7 4 13   13 6 6 | 7 7 13 1 13 4 6 |     | 171 |
| 172 |     2 13  6 | 7 7 13 1 13 4 6 | 7 4 13   13 6 6 | 7 7 13 1 13 4 6 |     | 172 |
| 173 | 4     13  6 | 7 7 13   13 4 6 | 7 4 13   13 6 6 | 7 7 13 1 13 4 6 |     | 173 |
| 174 | 4     13  6 | 7 7 13 1 13 4 6 | 7 4 13   13 6 6 | 7 7 13 1 13 4 6 |     | 174 |
| 175 | 4   2 13  6 | 7 7 13   13 4 6 | 7 4 13   13 6 6 | 7 7 13 1 13 4 6 |     | 175 |
| 176 |   13   13   | 7 7 13   13 4 6 | 7 4 13   13 6 6 | 7 7 13 1 13 4 6 |     | 176 |
| 177 |   13   13   | 7 7 13 1 13 4 6 | 7 4 13   13 6 6 | 7 7 13 1 13 4 6 |     | 177 |
| 178 |   13 2 13   | 7 7 13   13 4 6 | 7 4 13   13 6 6 | 7 7 13 1 13 4 6 |     | 178 |
| 179 |   13 2 13   | 7 7 13 1 13 4 6 | 7 4 13   13 6 6 | 7 7 13 1 13 4 6 |     | 179 |
| 180 | 4 13   13   | 7 7 13   13 4 6 | 7 4 13   13 6 6 | 7 7 13 1 13 4 6 |     | 180 |
| 181 | 4 13   13   | 7 7 13 1 13 4 6 | 7 4 13   13 6 6 | 7 7 13 1 13 4 6 |     | 181 |
| 182 | 4 13 2 13   | 7 7 13   13 4 6 | 7 4 13   13 6 6 | 7 7 13 1 13 4 6 |     | 182 |
| 183 | 4 13 2 13   | 7 7 13 1 13 4 6 | 7 4 13   13 6 6 | 7 7 13 1 13 4 6 |     | 183 |
| 184 |   13 2 13 6 | 7 7 13   13 4 6 | 7 4 13   13 6 6 | 7 7 13 1 13 4 6 |     | 184 |
| 185 |   13 2 13 6 | 7 7 13 1 13 4 6 | 7 4 13   13 6 6 | 7 7 13 1 13 4 6 |     | 185 |
| 186 | 4 13   13 6 | 7 7 13   13 4 6 | 7 4 13   13 6 6 | 7 7 13 1 13 4 6 |     | 186 |
| 187 | 4 13   13 6 | 7 7 13 1 13 4 6 | 7 4 13   13 6 6 | 7 7 13 1 13 4 6 |     | 187 |
| 188 | 4 13 2 13 6 | 7 7 13   13 4 6 | 7 4 13   13 6 6 | 7 7 13 1 13 4 6 |     | 188 |
| 189 | 7   13   13   6 | 7 7 13   13 4 6 | 7 4 13   13 6 6 | 7 7 13 1 13 4 6 |     | 189 |
| 190 | 7   13   13   6 | 7 7 13 1 13 4 6 | 7 4 13   13 6 6 | 7 7 13 1 13 4 6 |     | 190 |
| 191 | 7   13 2 13   6 | 7 7 13   13 4 6 | 7 4 13   13 6 6 | 7 7 13 1 13 4 6 |     | 191 |
| 192 | 7   13 2 13   6 | 7 7 13 1 13 4 6 | 7 4 13   13 6 6 | 7 7 13 1 13 4 6 |     | 192 |
| 193 | 7 4 13   13   6 | 7 7 13   13 4 6 | 7 4 13   13 6 6 | 7 7 13 1 13 4 6 |     | 193 |
| 194 | 7 4 13   13   6 | 7 7 13 1 13 4 6 | 7 4 13   13 6 6 | 7 7 13 1 13 4 6 |     | 194 |
| 195 | 7 4 13 2 13   6 | 7 7 13   13 4 6 | 7 4 13   13 6 6 | 7 7 13 1 13 4 6 |     | 195 |
| 196 | 7 4 13 2 13   6 | 7 7 13 1 13 4 6 | 7 4 13   13 6 6 | 7 7 13 1 13 4 6 |     | 196 |
| 197 | 7   13 2 13 6 6 | 7 7 13   13 4 6 | 7 4 13   13 6 6 | 7 7 13 1 13 4 6 |     | 197 |
| 198 | 7   13 2 13 6 6 | 7 7 13 1 13 4 6 | 7 4 13   13 6 6 | 7 7 13 1 13 4 6 |     | 198 |
| 199 | 7 4 13   13 6 6 | 7 7 13   13 4 6 | 7 4 13   13 6 6 | 7 7 13 1 13 4 6 |     | 199 |
| 200 | 7 4 13   13 6 6 | 7 7 13 1 13 4 6 | 7 4 13   13 6 6 | 7 7 13 1 13 4 6 |     | 200 |
| 201 | 7 4 13 2 13 6 6 | 7 7 13   13 4 6 | 7 4 13   13 6 6 | 7 7 13 1 13 4 6 |     | 201 |
| 202 | 7 4 13 2 13 6 6 | 7 7 13 1 13 4 6 | 7 4 13   13 6 6 | 7 7 13 1 13 4 6 |     | 202 |
| 203 | 7 4 13 2 13 6 6 | 7 7 13   13 4 6 | 7 4 13 2 13 6 6 | 7 7 13   13 4 6 |     | 203 |
| 204 | 7 4 13 2 13 6 6 | 7 7 13 1 13 4 6 | 7 4 13 2 13 6 6 | 7 7 13 1 13 4 6 |     | 204 |
| 205 | 7 4 13 2 13 6 6 | 7 7 13   13 4 6 | 7 4 13 2 13 6 6 | 7 7 13   13 4 6 | 2 | 205 |
| 206 | 7 4 13 2 13 6 6 | 7 7 13 1 13 4 6 | 7 4 13 2 13 6 6 | 7 7 13 1 13 4 6 | 2 | 206 |
| 207 | 7 4 13 2 13 6 6 | 7 7 13 1 13 4 6 | 7 4 13 2 13 6 6 | 7 7 13   13 4 6 | 4 | 207 |
| 208 | 7 4 13 2 13 6 6 | 7 7 13 1 13 4 6 | 7 4 13 2 13 6 6 | 7 7 13 1 13 4 6 | 4 | 208 |

FIG. 7

| | SEGMENT 1 | SEGMENT 2 | SEGMENT 3 | SEGMENT 4 | SEGMENT 5 | |
|---|---|---|---|---|---|---|
| 209 | 7 4 13 2 13 6 6 | 7 7 13 1 13 4 6 | 7 4 13 2 13 6 6 | 7 7 13    13 4 6 | 4  2          | 209 |
| 210 | 7 4 13 2 13 6 6 | 7 7 13 1 13 4 6 | 7 4 13 2 13 6 6 | 7 7 13 1 13 4 6 | 4  2          | 210 |
| 211 | 7 4 13 2 13 6 6 | 7 7 13 1 13 4 6 | 7 4 13 2 13 6 6 | 7 7 13    13 4 6 |    2       6  | 211 |
| 212 | 7 4 13 2 13 6 6 | 7 7 13 1 13 4 6 | 7 4 13 2 13 6 6 | 7 7 13 1 13 4 6 |    2       6  | 212 |
| 213 | 7 4 13 2 13 6 6 | 7 7 13 1 13 4 6 | 7 4 13 2 13 6 6 | 7 7 13    13 4 6 | 4          6  | 213 |
| 214 | 7 4 13 2 13 6 6 | 7 7 13 1 13 4 6 | 7 4 13 2 13 6 6 | 7 7 13 1 13 4 6 | 4          6  | 214 |
| 215 | 7 4 13 2 13 6 6 | 7 7 13 1 13 4 6 | 7 4 13 2 13 6 6 | 7 7 13    13 4 6 | 4  2       6  | 215 |
| 216 | 7 4 13 2 13 6 6 | 7 7 13 1 13 4 6 | 7 4 13 2 13 6 6 | 7 7 13    13 4 6 |       13      | 216 |
| 217 | 7 4 13 2 13 6 6 | 7 7 13 1 13 4 6 | 7 4 13 2 13 6 6 | 7 7 13 1 13 4 6 |       13      | 217 |
| 218 | 7 4 13 2 13 6 6 | 7 7 13 1 13 4 6 | 7 4 13 2 13 6 6 | 7 7 13    13 4 6 |     2 13      | 218 |
| 219 | 7 4 13 2 13 6 6 | 7 7 13 1 13 4 6 | 7 4 13 2 13 6 6 | 7 7 13 1 13 4 6 |     2 13      | 219 |
| 220 | 7 4 13 2 13 6 6 | 7 7 13 1 13 4 6 | 7 4 13 2 13 6 6 | 7 7 13    13 4 6 | 4     13      | 220 |
| 221 | 7 4 13 2 13 6 6 | 7 7 13 1 13 4 6 | 7 4 13 2 13 6 6 | 7 7 13 1 13 4 6 | 4     13      | 221 |
| 222 | 7 4 13 2 13 6 6 | 7 7 13 1 13 4 6 | 7 4 13 2 13 6 6 | 7 7 13    13 4 6 | 4  2 13       | 222 |
| 223 | 7 4 13 2 13 6 6 | 7 7 13 1 13 4 6 | 7 4 13 2 13 6 6 | 7 7 13 1 13 4 6 | 4  2 13       | 223 |
| 224 | 7 4 13 2 13 6 6 | 7 7 13 1 13 4 6 | 7 4 13 2 13 6 6 | 7 7 13    13 4 6 |    2 13 6     | 224 |
| 225 | 7 4 13 2 13 6 6 | 7 7 13 1 13 4 6 | 7 4 13 2 13 6 6 | 7 7 13 1 13 4 6 |    2 13 6     | 225 |
| 226 | 7 4 13 2 13 6 6 | 7 7 13 1 13 4 6 | 7 4 13 2 13 6 6 | 7 7 13    13 4 6 | 4    13 6     | 226 |
| 227 | 7 4 13 2 13 6 6 | 7 7 13 1 13 4 6 | 7 4 13 2 13 6 6 | 7 7 13 1 13 4 6 | 4    13 6     | 227 |
| 228 | 7 4 13 2 13 6 6 | 7 7 13 1 13 4 6 | 7 4 13 2 13 6 6 | 7 7 13    13 4 6 | 4  2 13 6     | 228 |
| 229 | 7 4 13 2 13 6 6 | 7 7 13 1 13 4 6 | 7 4 13 2 13 6 6 | 7 7 13    13 4 6 |   13    13    | 229 |
| 230 | 7 4 13 2 13 6 6 | 7 7 13 1 13 4 6 | 7 4 13 2 13 6 6 | 7 7 13 1 13 4 6 |   13    13    | 230 |
| 231 | 7 4 13 2 13 6 6 | 7 7 13 1 13 4 6 | 7 4 13 2 13 6 6 | 7 7 13    13 4 6 |   13 2 13     | 231 |
| 232 | 7 4 13 2 13 6 6 | 7 7 13 1 13 4 6 | 7 4 13 2 13 6 6 | 7 7 13 1 13 4 6 |   13 2 13     | 232 |
| 233 | 7 4 13 2 13 6 6 | 7 7 13 1 13 4 6 | 7 4 13 2 13 6 6 | 7 7 13    13 4 6 | 4 13    13    | 233 |
| 234 | 7 4 13 2 13 6 6 | 7 7 13 1 13 4 6 | 7 4 13 2 13 6 6 | 7 7 13 1 13 4 6 | 4 13    13    | 234 |
| 235 | 7 4 13 2 13 6 6 | 7 7 13 1 13 4 6 | 7 4 13 2 13 6 6 | 7 7 13    13 4 6 | 4 13 2 13     | 235 |
| 236 | 7 4 13 2 13 6 6 | 7 7 13 1 13 4 6 | 7 4 13 2 13 6 6 | 7 7 13 1 13 4 6 | 4 13 2 13     | 236 |
| 237 | 7 4 13 2 13 6 6 | 7 7 13 1 13 4 6 | 7 4 13 2 13 6 6 | 7 7 13    13 4 6 |   13 2 13 6   | 237 |
| 238 | 7 4 13 2 13 6 6 | 7 7 13 1 13 4 6 | 7 4 13 2 13 6 6 | 7 7 13 1 13 4 6 |   13 2 13 6   | 238 |
| 239 | 7 4 13 2 13 6 6 | 7 7 13 1 13 4 6 | 7 4 13 2 13 6 6 | 7 7 13    13 4 6 | 4 13    13 6  | 239 |
| 240 | 7 4 13 2 13 6 6 | 7 7 13 1 13 4 6 | 7 4 13 2 13 6 6 | 7 7 13 1 13 4 6 | 4 13    13 6  | 240 |
| 241 | 7 4 13 2 13 6 6 | 7 7 13 1 13 4 6 | 7 4 13 2 13 6 6 | 7 7 13    13 4 6 | 4 13 2 13 6   | 241 |
| 242 | 7 4 13 2 13 6 6 | 7 7 13 1 13 4 6 | 7 4 13 2 13 6 6 | 7 7 13    13 4 6 | 7    13    13    6 | 242 |
| 243 | 7 4 13 2 13 6 6 | 7 7 13 1 13 4 6 | 7 4 13 2 13 6 6 | 7 7 13 1 13 4 6 | 7    13    13    6 | 243 |
| 244 | 7 4 13 2 13 6 6 | 7 7 13 1 13 4 6 | 7 4 13 2 13 6 6 | 7 7 13    13 4 6 | 7    13 2 13    6 | 244 |
| 245 | 7 4 13 2 13 6 6 | 7 7 13 1 13 4 6 | 7 4 13 2 13 6 6 | 7 7 13 1 13 4 6 | 7    13 2 13    6 | 245 |
| 246 | 7 4 13 2 13 6 6 | 7 7 13 1 13 4 6 | 7 4 13 2 13 6 6 | 7 7 13    13 4 6 | 7 4 13    13    6 | 246 |
| 247 | 7 4 13 2 13 6 6 | 7 7 13 1 13 4 6 | 7 4 13 2 13 6 6 | 7 7 13 1 13 4 6 | 7 4 13    13    6 | 247 |
| 248 | 7 4 13 2 13 6 6 | 7 7 13 1 13 4 6 | 7 4 13 2 13 6 6 | 7 7 13    13 4 6 | 7 4 13 2 13     6 | 248 |
| 249 | 7 4 13 2 13 6 6 | 7 7 13 1 13 4 6 | 7 4 13 2 13 6 6 | 7 7 13 1 13 4 6 | 7 4 13 2 13     6 | 249 |
| 250 | 7 4 13 2 13 6 6 | 7 7 13 1 13 4 6 | 7 4 13 2 13 6 6 | 7 7 13    13 4 6 | 7    13 2 13 6 6 | 250 |
| 251 | 7 4 13 2 13 6 6 | 7 7 13 1 13 4 6 | 7 4 13 2 13 6 6 | 7 7 13 1 13 4 6 | 7    13 2 13 6 6 | 251 |
| 252 | 7 4 13 2 13 6 6 | 7 7 13 1 13 4 6 | 7 4 13 2 13 6 6 | 7 7 13    13 4 6 | 7 4 13    13 6 6 | 252 |
| 253 | 7 4 13 2 13 6 6 | 7 7 13 1 13 4 6 | 7 4 13 2 13 6 6 | 7 7 13 1 13 4 6 | 7 4 13    13 6 6 | 253 |
| 254 | 7 4 13 2 13 6 6 | 7 7 13 1 13 4 6 | 7 4 13 2 13 6 6 | 7 7 13    13 4 6 | 7 4 13 2 13 6 6 | 254 |
| 255 | 7 4 13 2 13 6 6 | 7 7 13 1 13 4 6 | 7 4 13 2 13 6 6 | 7 7 13 1 13 4 6 | 7 4 13 2 13 6 6 | 255 |

PULSE WIDTH MODULATED DISPLAY WITH HYBRID CODING

CROSS REFERENCE TO RELATED APPLICATION

This application claims priority under 35 U.S.C. 119(e) to U.S. Provisional Patent Application Ser. No. 60/403,190 filed Aug. 13, 2002.

TECHNICAL FIELD

This invention relates to a pulse width modulated light projection system, and more particularly, to a technique for operating a pulse width modulated light projection system to minimize motion contouring.

BACKGROUND ART

Presently, there exists a type of semiconductor device, known as a Digital Micromirror Device (DMD), comprising a plurality of individually movable micromirrors arranged in a rectangular array. Each micromirror pivots about limited arc, typically on the order of 10–12° under the control of a corresponding driver cell that latches a bit therein. Upon the application of a previously latched "1" bit, the driver cell causes its associated micromirror cell to pivot to a first position. Conversely, the application of a previously latched "0" bit to the driver cell causes the driver cell to pivot its associated micromirror to a second position. By appropriately positioning the DMD between a light source and a projection lens, each individual micromirror of the DMD device, when pivoted by its corresponding driver cell to the first position, will reflect light from the light source through the lens and onto a display screen to illuminate an individual picture element (pixel) in the display. When pivoted to its second position, each micromirror reflects light away from the display screen, causing the corresponding pixel to appear dark. An example of such DMD device is the DMD of the DLP™ projection system available from Texas Instruments, Dallas Tex.

Present day projection systems that incorporate a DMD of the type described control the brightness (illumination) of the individual pixels by controlling the duty cycle during which the individual micromirrors remain "on" (i.e., pivoted to their first position), versus the interval during which the micromirrors remain "off" (i.e. pivoted to their second position). To that end, such present day DMD-type projection systems use pulse width modulation to control the pixel brightness by varying the duty cycle of each micromirror in accordance with the state of the pulses in a sequence of pulse width segments. Each pulse width segment comprises a string of pulses of different time duration. The state of each pulse in a pulse width segment (i.e., whether each pulse is turned on or off) determines whether the micromirror remains on or off for the duration of that pulse. In other words, the larger the sum of the widths of the pulses in a pulse width segment that are turned on (actuated), the longer the duty cycle of each micromirror.

In a television projection system utilizing a DMD, the frame interval, i.e., the time between displaying successive images, depends on the selected television standard. The NTSC standard currently in use in the United States requires a frame interval of 1/60 second whereas certain European television standards employ a frame interval of 1/50 second. Present day DMD-type television projection systems typically achieve a color display by projecting red, green, and blue images either simultaneously or in sequence during each frame interval. A typical sequential DMD-type projection system utilizes a motor-driven color wheel interposed in the light path of the DMD. The color wheel has a plurality of separate primary color windows, typically red, green and blue, so that during successive intervals, red, green, and blue light, respectively, falls on the DMD. To achieve a color picture, red, green and blue light must fall on the DMD at least once within each successive frame interval. If only one red, one green and one blue image is made and each consumes 1/3 of the frame interval, then the large interval between colors will produce perceptible color breakup with motion. Present day DMD systems address this problem by breaking each color into several intervals and interleaving the intervals in time, thereby reducing the delay between colors.

Pulse width modulated projection systems of the type described above that have the ability to make multiple images of each primary color during each frame interval to yield a color picture often suffer from motion contouring on small amplitude transients, such as those associated with motion in a scene or motion of the viewer's eyes. This type of artifact results from changes in the distribution of the light pulses across different portions of the display period.

U.S. Pat. No. 5,986,640 discloses a scheme for reducing motion contouring by splitting the most significant bits in a sequence of pulse width segments between two or more time-adjacent segments (intervals). While this scheme serves to reduce contouring, it does not eliminate contouring on all transitions. Further, splitting bits in a manner sufficient to reduce contouring will increase the number of times each pixel must be addressed, thereby increasing the bandwidth needed to accomplish such addressing.

Thus, there is a need for a technique for operating a pulse width modulated display to reduce the motion contouring while overcoming the aforementioned disadvantages of the prior art.

BRIEF SUMMARY OF THE INVENTION

In accordance with present principles, there is provided a method for operating a pulse width modulated display system, such as a pulse width modulated display system that incorporates a Digital Micromirror Device (DMD), to selectively reflect light from a light source through a projection lens and onto a display screen. In such a display system, the illumination of each pixel for a given color is controlled responsive to pulses within a sequence of pulse width segments. The state of each pulse in each segment determines whether the pixel becomes illuminated during the interval associated with that pulse. To reduce the incidence of motion contouring, pixel brightness is increased by actuating selected pulses such that within a first range of brightness levels between first and second pixel brightness boundaries, a first large-duration pulse (or combination of pulses) becomes actuated to reach the second pixel brightness boundary. Within a second range of pixel brightness levels between second and third pixel brightness boundaries, the first large duration pulse (or combination of pulses) remains actuated, and upon reaching the third pixel brightness boundary, a second large duration pulse (or combination of pulses) also becomes actuated, with the first large duration pulse remaining actuated.

As the pixel brightness increases, another yet un-actuated large duration pulse (or combination of pulses) becomes actuated upon reaching a successively higher pixel brightness boundary, with each already actuated large duration pulse (or combination of pulses) remaining actuated. Each large duration pulse (or combination of pulses) that becomes actuated at each pixel brightness boundary is referred to as a "thermometer code" pulse because once actuated, that pulse (or combination of pulses) remains actuated upon further increases in pixel brightness above that brightness boundary in a manner analogous to a temperature level on a mercury thermometer. Depending on the width (i.e., duration) of each of the pulses within each segment, a given segment can include more than one such thermometer code pulse. However, upon an increase in pixel brightness to reach a given pixel brightness boundary, only a single previously de-actuated thermometer code pulse changes state (i.e., becomes actuated). Conversely, when the pixel brightness is decreased to a given pixel brightness boundary, only a single thermometer code pulse that had been actuated becomes now de-actuated, with the other thermometer code pulses that have yet to be de-actuated thus remaining actuated.

BRIEF DESCRIPTION OF THE DRAWINGS

FIG. 1 depicts a block schematic diagram of a present-day pulse width modulated display system;

FIG. 2 depicts a frontal view of a color wheel comprising part of the display system of FIG 1; and FIGS. 3–7 collectively illustrate a pulse map depicting each of a plurality of sequences of pulse width segments that control the brightness of one of the pixels within the display system of FIG. 1 for a given color to reduce motion contouring in accordance with the present principles.

DETAILED DESCRIPTION

FIG. 1 depicts a present-day pulse width modulated display system 10 of the type disclosed in the Application Report "Single Panel DLP™ Projection System Optics" published by Texas Instruments, June 2001 and incorporated by reference herein. The system 10 comprises a lamp 12 situated at the focus of a parabolic reflector 13 that reflects light from the lamp through a color wheel 14 and into an integrator rod 15. A motor 16 rotates the color wheel 14 to place a separate one of red, green and blue primary color windows between the lamp 12 and the integrator rod 15. In an exemplary embodiment depicted in FIG. 2, the color wheel 14 has diametrically opposed red, green and blue color windows $17_1$ and $17_4$, $17_2$ and $17_5$, and $17_3$ and $17_6$, respectively. Thus, as the motor 16 rotates the color wheel 14 of FIG. 2 in a counter-clockwise direction, red, green and blue light will strike the integrator rod 15 of FIG. 1 in an RGBRGB sequence. In practice, the motor 16 rotates the color wheel 14 at a sufficiently high speed so that during a frame interval of a 1/60 second, red, green and blue light each strikes the integrator rod five times, yielding 15 color images within the frame interval. Other mechanisms exist for successively imparting each of three primary colors. For example, a color scrolling mechanism (not shown) can perform this task as well.

Referring to FIG. 1, the integrator rod 15 concentrates the light from the lamp 12, as it passes through a successive one of the red, green and blue color windows of the color wheel 14, onto a set of relay optics 18. The relay optics 18 spread the light into a plurality of parallel beams that strike a fold mirror 20, which reflects the beams through a set of lenses 22 and onto a Total Internal Reflectance (TIR) prism 23. The TIR prism 23 reflects the parallel light beams onto a Digital Micromirror Device (DMD) 24, such as the DMD device manufactured by Texas Instruments, for selective reflection into a projection lens 26 and onto a screen 28.

The DMD 24 takes the form of a semiconductor device having a plurality of individual mirrors (not shown) arranged in an array. By way of example, the DMD manufactured and sold by Texas Instruments has a micromirror array of 1280 columns by 720 rows, yielding 921,600 pixels in the resultant picture projected onto the screen 28. Other DMDs can have a different arrangement of micromirrors. As discussed previously, each micromirror in the DMD pivots about a limited arc under the control of a corresponding driver cell (not shown) in response to the state of a binary bit previously latched in the driver cell. Each micromirror rotates to one of a first and a second position depending on whether the latched bit applied to the driver cell, is a "1" or a "0", respectively. When pivoted to its first position, each micromirror reflects light into the lens 26 and onto the screen 28 to illuminate a corresponding pixel. While each micromirror remains pivoted to its second position, the corresponding pixel appears dark. The interval during which each micromirror reflects light through the projection lens 26 and onto the screen 28 (the micromirror duty cycle) determines the pixel brightness.

The individual driver cells in the DMD 24 receive drive signals from a driver circuit 30 of a type well known in the art and exemplified by the circuitry described in the paper "High Definition Display System Based on Micromirror Device", R. J. Grove et al. *International Workshop on HDTV* (October 1994) (incorporated by reference herein.). The driver circuit 30 generates the drive signals for the driver cells in the DMD 24 in accordance with sequences of pulse width segments applied to the driver circuit by a processor 31. Each pulse width segment comprises a string of pulses of different time duration, the state of each pulse determining whether the micromirror remains on or off for the duration of that pulse. The shortest possible pulse (i.e., a 1-pulse) that can occur within a pulse width segment (sometimes referred to as a Least Significant Bit or LSB) typically has a 15-microsecond duration, whereas the larger pulses in the segment each have a duration that is an integer multiple of the LSB interval. In practice, each pulse within a pulse width segment corresponds to a bit within a digital bit stream whose state determines whether the corresponding pulse is turned on or off. A "1" bit represents a pulse that is actuated (turned on), whereas a "0" bit represents a pulse that is de-actuated (turned off).

The motion contouring minimization method of the present principles may best be understood by the following example for the field sequential system of FIG. 1 in which each color primary is displayed in a sequence of five pulse width segments. Each pulse width segment has a total pulse width of 51 LSBs, so each sequence of five pulse width segments has a total pulse width of 255 LSBs, thus enabling each pixel to have one of 256 brightness levels for a given color Each LSB (1-pulse) typically has a duration of 15 microseconds. Thus, each 51 LSB pulse width segment has a duration of 765 microseconds. Table 1 illustrates an illustrative arrangement of LSBs in each of the five segments comprising a pulse width sequence.

TABLE I

| SEGMENT | PULSE WIDTHS (LSB'S) |
| --- | --- |
| Segment 1 | 7 4 13 2 13 6 6 |
| Segment 2 | 7 7 13 1 13 4 6 |
| Segment 3 | 7 4 13 2 13 6 6 |

TABLE I-continued

| SEGMENT | PULSE WIDTHS (LSB'S) |
| --- | --- |
| Segment 4 | 7 7 13 1 13 4 6 |
| Segment 5 | 7 4 13 2 13 6 6 |

Motion contouring is minimized in accordance with present principles by minimizing the number and width of pulses that become de-actuated when one or more other pulses become actuated for a consecutive one-Least Significant Bit (i.e., a 1-pulse) change in brightness. In particular, to increase pixel brightness, selected pulses in one or more segments are actuated such that at each successive pixel brightness boundary, a yet un-actuated large duration pulse (i.e., a 13-pulse in the illustrative embodiment, or a combination of pulses, such as the 7-pulse and 6-pulse) becomes actuated. In addition, each large duration pulse (or combination of pulses) that was previously actuated upon reaching the preceding pixel brightness boundary remains actuated. Each large duration pulse (or combination of pulses) that becomes actuated to reach a given pixel brightness boundary is referred to as a "thermometer code" pulse because once actuated, each such thermometer code pulse remains actuated upon further increases in pixel brightness above that pixel brightness boundary in a manner analogous to the mercury in a mercury thermometer. (Upon reaching a particular temperature level, the mercury continues to rise above that level responsive to a temperature increase.) Depending on the width (i.e., duration) of each of the pulses within each segment, a given pulse width segment can have multiple thermometer code pulses.

FIGS. 3–6 collectively illustrate a pulse map of the sequences of pulse width segments that illuminate a corresponding pixel for a given color at each of brightness levels #0–255. In the illustrated embodiment, Segment 3 is chosen as the first segment whose thermometer code pulses are actuated, with each thermometer code pulse that had been actuated to reach pixel brightness boundary remaining actuated as the pixel brightness increases above that boundary. As seen in FIG. 3, reaching brightness level #1 requires actuation of a 1-pulse. Since Segment 3 has no 1-pulse in this example, the 1-pulse in Segment 2 is actuated. To reach pixel brightness level #2, the 2-pulse in Segment 3 becomes actuated with the 1-pulse in Segment 2 de-actuated at this brightness level. To reach pixel brightness level #3, the 1-pulse in Segment 2 and the 2-pulse in Segment 3 become actuated.

To achieve brightness level #4, the 4-pulse in Segment 3 becomes actuated with the previously actuated pulses de-actuated at this brightness level. To achieve each of pixel brightness levels #5 through #12, selected ones of the 4-pulse, 2-pulse and the 6-pulse (first) within Segment 3 and the 1-pulse in Segment 2 become actuated. Brightness level #13 (which constitutes a first pixel brightness boundary) is reached by actuating the 13-pulse (first) in Segment 3 with all the other pulses de-actuated at this pixel brightness level.

To reach brightness level #14, the 1-pulse in Segment 2 is actuated with the 13-pulse (first) in Segment 3 remaining actuated. Thus, above the first pixel brightness boundary (brightness level #13), the 13-pulse (first) within Segment 3 remains actuated. Hence, the 13-pulse (first) in Segment 3 constitutes the first thermometer code pulse in that segment that becomes actuated. Each of brightness levels #14–#25 is achieved by maintaining the 13-pulse in Segment 3 actuated and by actuating selected ones of the 4-pulse, 2-pulse and the 6-pulse (first) within Segment 3 and the 1-pulse in Segment 2. At brightness level #26 (which constitutes a second pixel brightness boundary), the 13-pulse (second) in Segment 3 become actuated, with the 13-pulse (first) in the same segment remaining actuated. At pixel brightness level #27, both the 13-pulses (first and second) in Segment 3 remain actuated, with the 1-pulse in Segment 2 now actuated at this brightness level. Thus, the 13-pulse (second) in Segment 3 constitutes the second thermometer code pulse that in segment that becomes actuated.

Each of brightness levels #28–#61 is achieved by maintaining the two 13-pulses (first and second) in Segment 3 actuated, and by actuating selected ones of the 7-pulse, 4-pulse, 2-pulse and the 6-pulses (first and second) in Segment 3 and selected ones of the 7-pulse, 1-pulse and 4-pulse in Segment 2. At brightness level #37, both the 7-pulse and the 6-pulse (second) in Segment 3 are actuated, and both of these pulses remain actuated as the pixel brightness level increases. Thus, the 7-pulse and the 6-pulse (second) in Segment 3 collectively constitute a combination thermometer code pulse. Note that at pixel brightness level #51, all of the pulses in Segment 3 become actuated. With the exception of the 2-pulse in Segment 3, all of the other pulses in that segment remain actuated as the pixel brightness level increases above brightness level #51.

Referring to FIG. 4, at brightness level #62, (which constitutes a successively higher pixel brightness boundary), the 13-pulse (first) in Segment 2 becomes actuated, along with all of the pulses in Segment 3 except the 2-pulse. To reach brightness level #63, the 1-pulse in Segment 2 is actuated, with the 13-pulse (first) in Segment 2 and all of the pulses in Segment 3 except the 2-pulse remaining actuated. Thus, the 13-pulse (first) in Segment 2 becomes the first thermometer code pulse in that segment which is actuated.

Further increases in pixel brightness to reach one of brightness levels #63–#74 of FIG. 4 are achieved by actuating selected ones of the pulses in Segment 2 and the 2-pulse in Segment 3, with the previously actuated thermometer code pulse (i.e., the 13-pulse (first)) in Segment 2 remaining actuated, along with all the other pulses in Segment 3 remaining actuated. To reach brightness level #75, the 13-pulse (second) in Segment 2 becomes actuated, along with the previously actuated thermometer code pulse in that segment, and all of the pulses in Segment 3 except the 2-pulse. Above brightness level #75, the 13-pulse (second) in Segment 2 remains actuated. Thus, the 13-pulse (second) in Segment 2 constitutes the second thermometer code pulse in this segment that is actuated upon reaching an associated pixel brightness boundary, and remains actuated for increases in pixel brightness above that pixel brightness boundary.

As can now be appreciated, each large pulse (e.g., the 13-pulses) in each segment, or a combination of pulses (e.g., the 7-pulse and the 6-pulse (second) in Segment 3) that collectively comprise a large duration pulse, once actuated to reach an associated pixel brightness boundary, remain actuated for successively higher pixel brightness levels. Thus, each such pulse (or combination of pulses) constitutes a thermometer code pulse in accordance with the present principles. In practice, each thermometer code pulse has the property of being sufficiently large (i.e., of a sufficiently long duration) so that once actuated to reach a pixel brightness boundary, the pulse remains actuated at brightness levels above that pixel brightness boundary while limiting the total number of pulses in a segment. In other words, at a given pixel brightness boundary, a single thermometer code pulse (or a combination of such pulses that comprise a thermometer code pulse) become actuated and remains actuated as the pixel brightness increases above that boundary. Conversely, for a decrease in pixel brightness to a given pixel brightness boundary only a single thermometer pulse becomes de-actuated with the thermometer code pulses not yet de-actuated remaining actuated until a next successively lower pixel brightness boundary is reached. However, each thermometer code pulse within each segment should not be so large so that when actuated or de-actuated, there is noticeable transient for an incremental change in pixel brightness (i.e., an increase in pixel brightness to a next higher level or decrease in pixel brightness to a next lower level).

Moreover, the selection of thermometer code pulses should serve to confine to substantially a singe pulse width segment the "swapping" of pulses (i.e., the selection of pulses which are actuated) to reach a particular brightness state. However, it is not necessary to confine the swapping of pulses to substantially a single segment (i.e., a modified binary pulse arrangement) to obtain the benefits of this invention. The swapping of pulses that occur to reach a particular brightness level could occur among several segments so long as a single thermometer code pulse (or combination of pulses) in a single segment become actuated or de-actuated between successive pixel brightness boundaries.

The foregoing describes a technique for minimizing motion contouring in a pulse width modulated display.

What is claimed is:

1. A method for operating a pulse width modulated display system having a plurality of pixels, each of whose illumination for a given color is controlled responsive to pulses within each segment of a sequence of pulse width segments, the state of each pulse in each segment determining whether the pixel becomes illuminated during the interval associated with that pulse, comprising the step of:

actuating selected pulses to increase the pixel brightness such that within a first range of pixel brightness levels between first and second pixel brightness boundaries, a first large-duration pulse element becomes actuated to reach the second pixel brightness boundary, and within a second range of pixel brightness levels between second and third pixel brightness boundaries, the first large duration pulse element remains actuated, and upon reaching the third pixel brightness boundary a second large duration pulse element become actuated while the first large duration pulse element remains actuated.

2. The method according to claim 1 wherein at least one of the first and second large duration pulse elements comprises a single pulse.

3. The method according to claim 1 wherein at least one of the first and second large duration pulse elements comprises a combination of pulses.

4. A method for operating a pulse width modulated display system having a plurality of pixels, each of whose illumination for a given color is controlled responsive to pulses within each segment of a sequence of pulse width segments, the state of each pulse in each segment determining whether the pixel becomes illuminated during the interval associated with that pulse, comprising the step of:

actuating selected pulses to increase the pixel brightness such that within a first range of pixel brightness levels between first and second pixel brightness boundaries, a first large-duration pulse element becomes actuated to reach the second pixel brightness boundary, and within a second range of pixel brightness levels between second and third pixel brightness boundaries, the first large duration pulse element remains actuated, and upon reaching the third pixel brightness boundary a second large duration pulse element become actuated while the first large duration pulse element remains actuated wherein the duration of each large duration pulse element is selected to minimize a transient associated with an incremental increase in pixel brightness to reach a pixel brightness boundary and to minimize the number of pulses in each segment.

5. The method according to claim 1 wherein at least pair of the large duration pulse elements reside in the same segment.

6. The method according to claim 1 wherein at least a pair of the large duration pulse elements reside in different segments.

7. The method according to claim 1 wherein the pulses that are actuated to increase pixel brightness are confined to substantially the same segment.

8. A method for operating a pulse width modulated display system having a plurality of pixels, each of whose illumination for a given color is controlled responsive to pulses within each segment of a sequence of pulse width segments, the state of each pulse in each segment determining whether the pixel becomes illuminated during the interval associated with that pulse, comprising the step of:

decreasing the pixel brightness by de-actuating selected pulses such that within at a given pixel brightness boundary, a first large-duration pulse element that had been actuated now becomes de-actuated and at a successively lower pixel brightness boundary, the first large duration pulse element remains de-actuated, and second large duration pulse element becomes de-actuated, with each previously actuated large duration pulse element not yet actuated remaining actuated.

9. The method according to claim 8 wherein at least one of the first and second large duration pulse elements comprises a single pulse.

10. The method according to claim 8 wherein at least one of the first and second large duration pulse elements comprises a combination of pulses.

11. A method for operating a pulse width modulated display system having a plurality of pixels, each of whose illumination for a given color is controlled responsive to pulses within each segment of a sequence of pulse width segments, the state of each pulse in each segment determining whether the pixel becomes illuminated during the interval associated with that pulse, comprising the step of:

decreasing the pixel brightness by de-actuating selected pulses such that within at a given pixel brightness boundary, a first large-duration pulse element that had been actuated now becomes de-actuated and at a successively lower pixel brightness boundary, the first large duration pulse element remains de-actuated, and second large duration pulse element becomes de-actuated, with each previously actuated large duration pulse element not yet actuated remaining actuated wherein the duration of each large duration pulse element is selected to minimize a transient associated with a unitary decrease in pixel brightness to reach a pixel brightness boundary and minimize the number of pulses in each segment.

12. The method according to claim 8 wherein the large duration pulse elements reside in the same segment.

13. The method according to claim 8 wherein the large duration pulse elements reside in different segments.

14. The method according to claim 8 wherein the de-actuated pulses are confined to substantially the same segment.

* * * * *